July 17, 1956  H. A. RAHMEL  2,755,161
APPARATUS FOR INDICATING AT A REMOTE POINT THE TUNING
CONDITION OF A PLURALITY OF WAVE SIGNAL RECEIVERS
Filed April 24, 1950  4 Sheets-Sheet 1

Fig. 1a

INVENTOR.
Henry A. Rahmel
BY
Mason, Kolehmainen, Rathburn & Wyss
Att'ys

United States Patent Office 2,755,161
Patented July 17, 1956

2,755,161

APPARATUS FOR INDICATING AT A REMOTE POINT THE TUNING CONDITION OF A PLURALITY OF WAVE SIGNAL RECEIVERS

Henry A. Rahmel, Evanston, Ill., assignor to A. C. Nielsen Company, Chicago, Ill., a corporation of Illinois Application April 24, 1950, Serial No. 157,712

6 Claims. (Cl. 346—37)

The present invention relates to a system and apparatus for indicating at a remote point the tuning condition of a plurality of wave signal receivers.

It is pretty much conceded that instrumented methods of determining the listening or viewing habits of users of wave signal receivers is the only satisfactory way of obtaining accurate information in this regard. In many cases it is desirable that information with respect to the tuning condition of a plurality of wave signal receivers be instantaneously available at a central station or a central point remote from the places where the receivers are located so that the analysis organization which prepares an analysis of the listening habits of wave signal receiver users from data obtained by such instrumental methods may have this information to prepare reports with a minimum of delay. It will be understood that if it is necessary to record the information at the various homes in which the wave signal receiver use is to be logged, that the gathering of the recorded information at the end of each day, for example, is, if not impossible, at least prohibitive from a cost standpoint. Obviously, if the records produced of the tuning conditions of the receivers are permitted to accumulate for a predetermined calendar period, such as one week, two weeks, or longer, a substantial delay in the report which is eventually prepared based on the facts obtained by the instrumented methods is immediately introduced. Thus, it is particularly desirable, and especially in an area where a substantial number of homes are to be logged, to have an arrangement whereby the information of the tuning condition of these different receivers is either instantaneously available or available at periodic intervals, preferably not to exceed 24 hours.

Instrumented methods of determining the listening habits of home receiver users whether the receivers be radio, television, frequency modulation or a combination of one or more of these, generally involve the use of the recording device operating in conjunction with each receiver used for the sampling system to record the extent of use of the receiver as a function of time and the particular wave signal transmitters to which the receiver is tuned for program reception. Conventionally, such a device comprises a movable record receiving element such as movable paper tape, magnetic tape or wire or other recording medium, although it might similarly comprise indicating means, the indications of which may or may not be recorded.

Where a plurality of receivers, each capable of being tuned to a plurality of different transmitters, are involved, it is, of course, necessary to obtain at the central station unique identification means not only of the particular receiver under consideration, but also of the transmitting stations to which each receiver is tuned. In recently issued Rahmel et al. Patent 2,484,733 granted October 11, 1949, and assigned to the same assignee as the present application, there is disclosed an arrangement whereby identification of the transmitting channel is obtained by producing signals of unique characteristics such as variable frequency characteristics for each transmitting station likely to be tuned in by the receiver. To identify the receiver itself another unique signal is employed which in the above mentioned patent is used as the carrier frequency for the audio signals identifying the transmitting stations to which the receiver is tuned. The arrangement of the above mentioned Rahmel patent is most satisfactory when a space link is employed or when connections between the monitored receiver and the central station can be accomplished by power lines or the like. Obviously, where the receivers are located in different homes several miles or many miles distant from the central station, a power line link is impractical and the space link, of course, requires approval by the Federal Communications Commission, which always produces an obstacle. It is obvious that the central station and the receiver may be connected by leased telephone lines or the like and the present invention is particularly concerned with a simple arrangement of identifying not only the receiver, but also the transmitting station to which the receiver is tuned in a simple manner and producing a recordable signal at a central station where a record of the tuning of a large number of receivers may be made.

It will be understood that the economics of using leased telephone lines depends on the rate structure involved. If the leasing charges for such lines are relatively low, the central station may be connected directly with the homes in a large area by individual lines. On the other hand, it may be desirable to have the homes connected by short leased lines to an adjacent telephone exchange and then the information for a large number of homes may be transferred to a central station many miles distant over a single pair of leased lines.

Accordingly, it is an object of the present invention to provide a new and improved apparatus for producing an indication or record of the listening habits of wave signal receiver users.

It is another object of the present invention to provide an improved apparatus of the character described in which the equipment associated with the wave signal receiver is of such small size as to be capable of being disposed within the available cabinet space of substantially all types of receivers.

Still another object of the present invention is to provide an apparatus employing a single record receiving element upon which is recorded information with respect to the tuning condition of a plurality of receivers remotely disposed with respect to the recording apparatus as well as each other, and to provide accurate information not only of the transmitting stations to which the receivers are tuned, but also information as to which receivers are tuned to which transmitting stations.

It is a further object of the present invention to provide at a central recording point substantially instantaneous information of the tuning condition of a large number of receivers located in different and widely scattered homes in the area under consideration.

Further objects and advantages of the present invention will become apparent as the following description proceeds and the features of novelty which characterize the invention will be pointed out with particularity in the claims annexed to and forming a part of this specification.

For a better understanding of the present invention reference may be had to the accompanying drawings in which.

Essentially the present invention comprises a receiver attachment for each receiver which converts the tuning position of the associated receiver to an audio frequency signal, the different tuning positions being indicated by different audio frequencies. The outputs of the audio oscillators from a plurality of receivers are supplied over telephone lines to a central station where by means of suitable stepping switches receiver identification is provided. The receiver identification and identification of the transmitting stations to which the receivers are tuned, are simultaneously recorded. Such recording may be on a minute by minute basis or, if desired, longer intervals of time may be involved. In any event a complete record of the tuning conditions is available to the analysis organization at a central point, whereby no delay in the preparation of an analysis of the recorded data need occur.

Figure 1A:
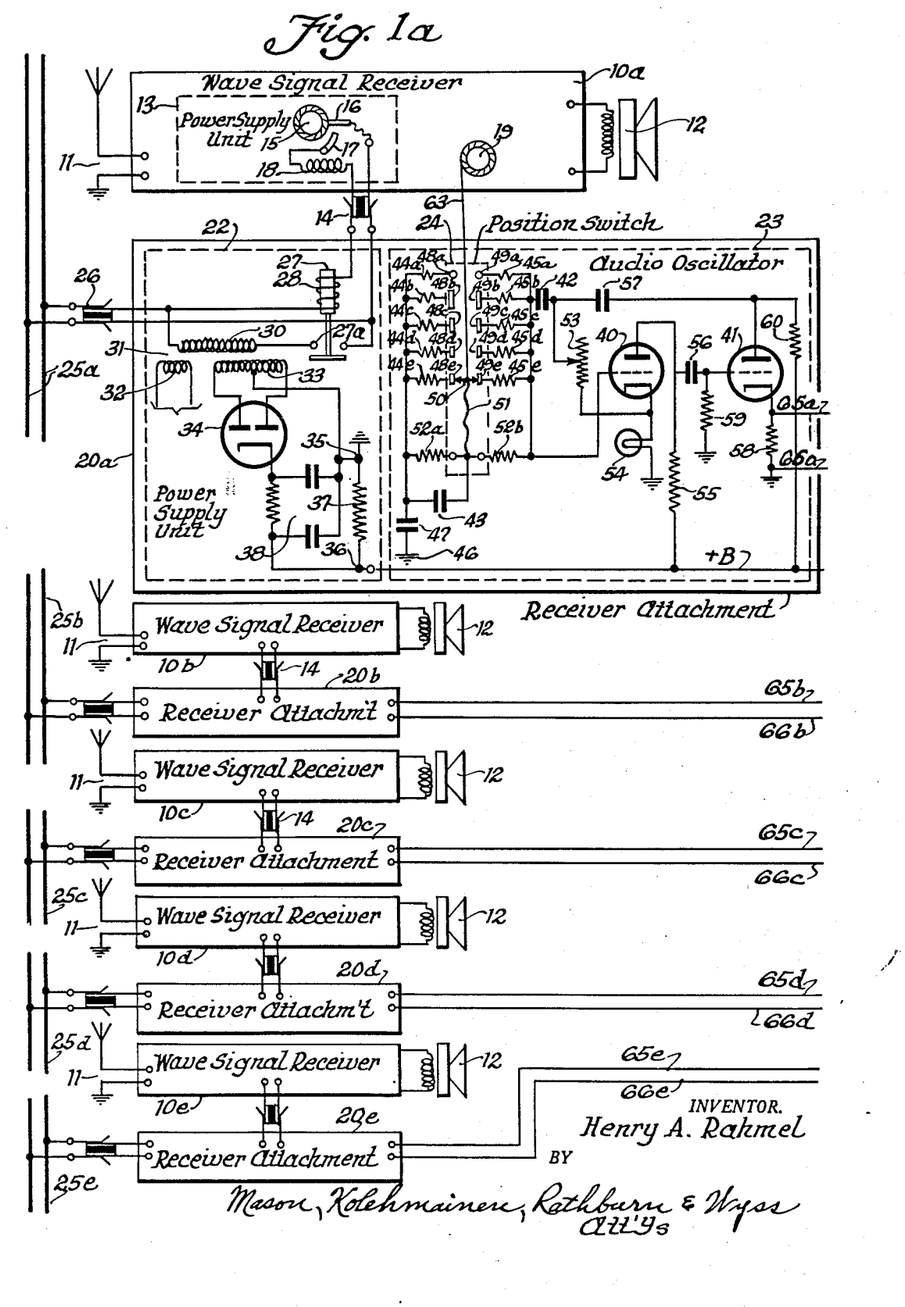
Figs. 1a and 1b are diagramatic illustrations showing first and second parts of a system and apparatus employing the present invention, arranged so as to be united into a single disclosure.
Figure 1B:
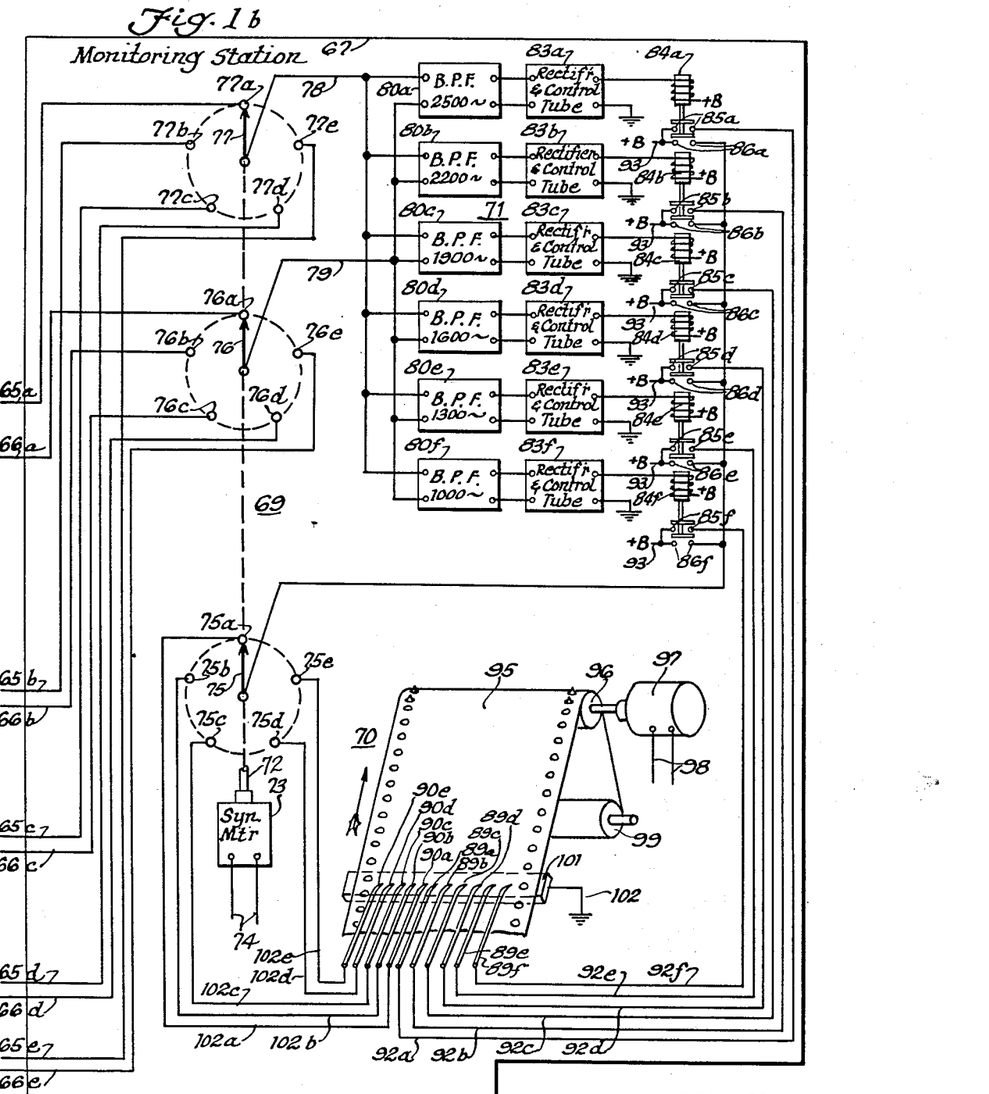

Referring now to Figs. 1a and 1b of the drawings, there are illustrated by way of example a plurality of wave signal receivers 10a, 10b, 10c, 10d and 10e located in widely scattered homes which homes have been chosen on a statistical basis so as to give a representative picture of the wave signal receiver use in a predetermined area. For illustrating the present invention, it is assumed that all of the receivers 10 are located in different homes. It should be understood, however, that some of these homes may be multi-receiver homes in which case monitoring of all the receivers in the particular homes is necessary and will be accomplished in a manner readily understood by those skilled in the art. All of the receivers 10 are indicated diagrammatically although the receiver 10a is shown in slightly more detail than the others. It will be understood that these wave signal receivers may be identical but more than likely, they will be quite different with one of the receivers probably being a console model while others might be small table models or even portable models. These receivers furthermore could be radio receivers or television receivers. Each of the receivers is indicated as comprising an antenna ground circuit 11 and a signal reproducer schematically indicated as a loud speaker 12, although in the case of a television receiver, this signal reproducer will obviously comprise a cathode ray tube. These receivers are likely to be superheterodyne receivers, although as far as the present invention is concerned, it is not essential that they be this type of receiver. It is assumed that these receivers are each adapted to be connected to a conventional house wiring circuit designated as 25a, 25b, 25c, 25d, and 25e for the five receivers indicated. These house wiring circuits may be widely separated and may be supplied by entirely different power companies so they are indicated as independent circuits in the drawings. In the event, that the receivers are all located in a single home, the house wiring circuit would be common to all the receivers. However, in such case it would not be necessary to use the leased wire arrangement to be described hereinafter.

Considering now the wave signal receiver 10a, which is representative of all the receivers 10, it is illustrated as including a power supply unit generally indicated at 13 which is connected by means of a plug connector 14 with a suitable source of power. The power supply unit 13 includes the conventional "on-off" switch control knob 15 which preferably is combined with the manual volume control means in the conventional manner. As illustrated, the control knob 15 controls the "on-off" switch comprising the contacts 16 and 17 which are connected in series with a suitable winding 18, which may comprise a primary winding of a suitable transformer. The receiver 10a is also illustrated as comprising a conventional tuning knob 19 which is mounted on a suitable tuning shaft for controlling the position of the resonant frequency varying means such as the ganged condensers, if condenser tuning is employed, or the position of the iron core, if permeability tuning is employed. It will be understood that the tuning shaft might be positioned by push buttons or push buttons might be employed to control the tuning condition of the wave signal receiver without in any way affecting the position of a rotatable tuning shaft. As will become apparent from the following description the present invention is readily applicable to push button operated receivers whether they control the position of the tuning shaft or not.

If the wave signal receiver employs a tuning shaft which is positioned at various positions whenever the receiver is tuned to transmitting stations whose signal is receivable by said receiver, it will be apparent that the position of the tuning shaft will be indicative of the tuning condition of the receiver. Experience has shown that with a very high percentage of receivers a mechanical link can be connected to the dial drum. For the purpose of simplifying the disclosure, the present invention has been specifically illustrated in that connection.

Since, as has been pointed out above, the recording and translating equipment which is fairly sensitive and somewhat bulky apparatus is located at a point remote from the receivers such as 10a, it is necessary to provide at each receiver apparatus which is capable of transmitting to a remote point information pertinent to the tuning condition of the associated receiver. In accordance with the present invention this apparatus is very small and compact so that it may be disposed in the available cabinet space of most receivers. As illustrated each wave signal receiver such as 10a, 10b, and 10c has associated therewith an apparatus provided in accordance with the present invention which may be referred to as a receiver attachment. These receiver attachments are designated by the reference numerals 20a, 20b and 20c for the receivers 10a, 10b and 10c respectively. The receiver attachment 20a is shown in detail in Fig. 1a of the drawings and essentially comprises three units 22, 23 and 24 as follows: a power supply unit 22, an audio oscillator 23, and a position switch 24. The power supply unit 22 is preferably connected to a source of alternating current such as the house wiring circuit generally designated by the reference numeral 25a through a suitable plug connector 26. In order that the receiver attachment 20a is energized only when the receiver 10a is turned on (and similarly for the receiver attachments 20b and 20c) there is provided in the power supply unit 22 a relay 27 having its winding 28 connected in series with the combined volume control and "on-off" switch of the wave signal receiver 10a. Consequently whenever the wave signal receiver 10a is turned on the flow of current to the receiver through the plug connectors 26 and 14 causes relay 27 to be energized to close its normally open contacts 27a. It will be apparent that with the arrangement described the receiver attachment 20a may be applied to the receiver 10a as far as the electrical circuit thereof is concerned merely by removing one portion of the plug connector 14 from the conventional power circuit and instead applying the corresponding portion of the plug connector 26 of the power supply unit 22 to the power circuit and connecting the plug connector 14 as shown in Fig. 1a of the drawings.

The contacts 27a of the relay 27 are illustrated as controlling the energization of the primary winding 30 of a transformer 31 including secondary windings 32 and 33 respectively. The secondary winding 32 preferably supplies the filament voltage for the electron discharge valves employed in the receiver attachment 20a. The secondary winding 33 on the other hand is connected to the anodes of a twin diode 34 connected in the circuit of a full wave rectifier so as to provide at the terminals 35 and 36 between which there is provided a resistor 37, a direct current potential suitably filtered as by means of a filtering unit 38.

For the purpose of providing a signal uniquely representative of the tuning condition of the wave signal receiver associated therewith such as the wave signal receiver 10a there is provided an audio oscillator 23 which may be any suitable form of audio oscillator but which has been specifically illustrated as an RC oscillator of the Wien bridge type. As illustrated the audio oscillator 23 is identical with that disclosed in the above mentioned Rahmel et al. patent. The RC or Wien bridge oscillator 23 operates directly at audio frequencies. As illustrated it comprises a two-stage audio amplifier including triodes 40 and 41 respectively and a resistance-capacitance bridge generally referred to as an RC bridge, which is at the same time regenerative and degenerative. The RC bridge comprises the capacitors 42 and 43 which are preferably identical in rating and two sets of resistors generally designated by the reference numerals 44 and 45, one resistor from each set being adapted to be selectively rendered effective at any one time. The set of resistors 44 which are in a sense arranged in parallel, but only one of which is effective at any one time, are specifically designated as 44a, 44b, 44c, 44d, and 44e. Similarly the resistors 45 are designated as 45a, 45b, 45c, 45d and 45e respectively. The resistors marked with the same subscript preferably have identical values of resistance but the resistors having different subscripts differ from each other and as schematically illustrated have increasing values of resistance as the subscripts change from "a" to "e." One terminal of each of the resistors 44a to 44e inclusive is connected to a common terminal and to one terminal of the capacitor 43. As illustrated this terminal is grounded as indicated at 46 through a suitable capacitor 47. The other ends of the resistors 44a to 44e are respectively connected to spaced contact members 48a, 48b, 48c, 48d and 48e of the position switch 24. Similarly the resistors 45a to 45e inclusive have a common terminal which is connected to one terminal of the capacitor 42. The other terminals of the resistors 45 are connected to spaced contact members 49a, 49b, 49c, 49d and 49e of the position switch 24 and are disposed in linear relationship opposite the corresponding contact members 48a, 48b, 48c, 48d and 48e so as to be engageable by a suitable sliding switch contact 50, the contacts with similar subscripts being simultaneously engaged. The sliding contact 50 is furthermore adapted to be connected by a flexible conductor 51 to the other terminal of the capacitor 43. The other terminal of the capacitor 42 is connected through a suitable adjustable resistor 53 with the cathode of the triode 40. The resistor 53 is preferably a feed back resistor which is adjustable so that the feed back may be adjusted to an optimum value. The flexible terminal 51 is also connected to the control electrode of the triode 40.

In order that an audio frequency is producible by the audio oscillator 23 when the sliding switch contact 50 is not in engagement with any of the associated contacts 48 and 49 there are provided a pair of resistors 52a and 52b which are connected in parallel with the particular resistors 44 and 45 rendered effective by the sliding switch contact 50. These resistors are preferably of such magnitude as to insure an audio frequency output of 1000 cycles, for example, if no other pair of resistors 44 and 45 are connected into the RC circuit.

For the purpose of improving the stability of the audio oscillator 23 there is preferably provided in the cathode circuit of the triode 40 a resistor 54 in the form of a low wattage lamp whose resistance varies with temperature. When the triode 40 attempts to draw more current the temperature of the lamp 54 increases, thereby effectively increasing the bias on the triode 40 and increasing the degenerative effect. Consequently the resistor or lamp 54 tends automatically to hold the output of the oscillator constant and the distortion to a low value. The anode of the triode 40 is preferably connected to the terminal 36 of the power supply unit 22 which effectively is a source of +B potential through a voltage dropping resistor 55. This voltage dropping resistor 55 is preferably proportioned so that the average current flowing through the lamp or resistor 54 falls on the knee of the lamp's temperature resistance characteristic whereby the desired stabilizing effect occurs. The plate circuit of the triode 40 is connected by a suitable coupling condenser 56 to the control electrode of the triode 41. The anode of the triode 41 is connected by a coupling capacitor 57 with the RC bridge and specifically with the terminal of the condenser 42 connected to the adjustable resistor 53. The cathode of the triode 41 is grounded as indicated through a resistor 58. A suitable grid leak for the triode 41 is provided by means of the resistor 59. The coupling capacitor 56 should be large if it is desired to maintain oscillation at low frequencies. Similarly coupling capacitor 57 must be very large as it works into a very low resistance composed of the resistors 53 and 54 connected in series. Preferably the capacitor 57 is an electrolytic condenser and works satisfactorily in view of the fact that the direct current polarizing voltage is higher than the alternating current voltage it must handle. The anode of the triode 41 is connected to the source of +B potential or in other words to the terminal 36 of the power supply unit 22 through a suitable voltage dropping resistor 60. The output of the audio frequency oscillator is illustrated as being obtained from across the resistor 58 in the cathode circuit of the triode 41.

It will be understood that the output frequency of the audio oscillator 23 may be controlled by varying the capacitance of the capacitors 42 and 43 or the resistance of the resistors 44 and 45 or both. When the capacitors 42 and 43 are equal and the particular resistors 44 and 45 which are rendered effective by the movable switch arm 50 are equal, and the resistors 52a and 52b are equal, then the frequency of the output of the audio oscillator may be given by the following expression:

$$f = \frac{1}{2\pi RC}$$

where R is the value in ohms of the parallel resistance circuit comprising the resistor 52a and the particular resistor 44 which is rendered effective as for example the resistors 44e for the position indicated in Fig. 1a of the drawings, and C is the capacitance in farads. If none of the resistors 44 and 45 are rendered effective for a particular setting it will be apparent that R will comprise the resistance of the resistor 52a. For the purposes of the present invention the resistors 44e and 45e preferably have a value such that the output frequency of the audio oscillator is approximately 1300 cycles and the resistance of the other resistors are decreased in value so that the frequency steps at the output of the audio oscillator 23 differ from each other by about 300 cycles with the highest frequency being produced when the resistors 44a and 45a are rendered effective. When only the resistors 52a and 52b are effective a lower frequency of the order of 1000 cycles or the like appears at the output of the audio oscillator which is indicative of tuning the wave signal receiver 10a to a station for which no channel is provided in the receiver attachment 20a or in other words to what may be termed tuning to "all other stations."

For the purpose of controlling the output frequency of the audio oscillator 23 in dependence upon the tuning condition of the associated wave signal receiver 10 the slidable contact switch 50 of the position switch 24 which engages with the contacts 48 and 49 is connected by suitable means, such as a Bowden wire or the like generally indicated by the reference numeral 63, with the manual tuning knob 19 of the tuning shaft so that if the tuning condition of the wave signal receiver 10 is changed the resistances in the RC bridge of the audio oscillator 23 are selectively changed and consequently the output frequencies of the audio oscillator are varied. Although the contacts 48 and the contacts 49 are schematically illustrated in fixed positions, it will be understood that these contacts are adjustably spaced so that any desired channels may be chosen within the limits of the number provided for by the contacts 48 and 49.

It should be understood that in the event that the wave signal receiver 10a is provided with push buttons suitable means may be provided to insure the connection of the proper resistances 44 and 45 in the RC bridge of the audio oscillator 23 in dependence upon the particular push button which is actuated. Although five frequency steps are illustrated for the audio oscillator 23 exclusive of the "all other" stations frequency condition, it will be apparent that a larger or smaller number may be employed depending upon the number of stations to which the wave signal receiver 10 is normally tuned. It will furthermore be understood that the various frequency steps of the audio output of the oscillator 23 may be representative of channels in the AM, FM or television bands or a combination thereof so that the tuning condition of the wave signal receiver, regardless of the band to which it is tuned, will be indicated by a predetermined audio frequency output of the audio oscillator 23.

It will be understood by those skilled in the art that although in the standard broadcast band each station is assigned a band width of 10 kc., the extreme limits of movement of the tuning shaft while remaining tuned to the same station, vary considerably for different stations. It is, of course, essential that regardless of the position of the tuning shaft, for example, of the receiver when tuned to a station which may be received over a considerable angular movement in the case of a rotary tuning shaft or linear movement in the case of longitudinally movable tuning means, that the same audio output at the oscillator 23 be provided. This is represented schematically in Fig. 1a of the drawings by variable widths for the contacts 48 and 49. Where the tuning shaft of the receiver may be moved over quite an angle while remaining tuned to the same station wide contacts 48 and 49 are provided for the associated channels in the audio oscillator 23. In other words the switch comprising the spaced linearly arranged contacts 48 and 49 and the sliding contact 50 are designed to insure the proper audio frequency output for all positions of the tuning shaft of the receiver 10a that the particular channels provided for in the receiver attachment 20a can be received. Such an arrangement is disclosed and broadly claimed in Rahmel Patent 2,484,734 granted October 11, 1949, and assigned to the same assignee as the present application. It should be understood that the position switch 24 comprising the sliding contact 50 and the stationary contacts 48 and 49 is only schematically shown. A suitable switch for this purpose is disclosed and claimed in a copending application of Fred Krahulec, Serial No. 78,926, filed March 1, 1949, and assigned to the same assignee as the present application.

With the arrangement described thus far, the different tuning conditions of the wave signal receivers 10a, 10b and 10c are represented by different predetermined audio frequencies each different audio frequency being indicative of a different tuning condition of the associated wave signal receiver. In order that a record may be produced at a remote point of the particular output frequency of the audio oscillator associated with each receiver so as to identify the receiver as well as the tuning condition thereof, each receiver attachment 20, has the output of its audio oscillator 23 connected to a separate pair of telephone lines designated at 65a and 66a for the receiver attachment 20a, 65b and 66b for the receiver attachment 20b, etc. These telephone lines which may be leased lines are adapted to extend to a suitable monitoring station or recording point specifically designated in Fig. 1b by the reference numeral 67. The central or monitoring station 67 may comprise property of the analysis organization at which an instantaneous and continuous record of the tuning condition of the receivers 10 may be produced. As illustrated, the central station or monitoring station includes three main units, namely, a synchronously driven rotary switch mechanism 69, a recording device 70, and a signal identification unit 71.

Considering first the synchronous switching means 69, it is schematically illustrated as comprising a rotary shaft 72 driven at a suitable constant speed by a synchronous motor 73 energized from a suitable power source 74.

Associated with the shaft 72 are a plurality of rotatable switch arms 75, 76 and 77. The switch arm 75 is adapted successively to engage a plurality of spaced stationary contacts 75a, 75b, 75c, 75d and 75e. Similarly the switch arm 76 is adapted to engage a plurality of contacts 76a, 76b, 76c, 76d and 76e. Also the switch arm 77 is adapted to successively engage a plurality of spaced stationary contacts 77a, 77b, 77c, 77d and 77e. The synchronous switches are so arranged that the contacts marked with identical subscripts are simultaneously engaged by their respective switch arms 75, 76 and 77. As illustrated in the drawings, the contacts 77a, 77b, 77c, 77d and 77e are respectively connected to a different one of the conductors or leased telephone lines 65, each contact being connected to the particular line 65 marked with the same subscript. Similarly, the contacts 76a to 76e inclusive are connected to the telephone lines 66, each contact also being connected to the particular line having the same subscript. With this arrangement, it will be apparent that rotation of the switch arms 76 and 77 will successively connect the receiver attachments 20a to 20e inclusive with the central station 67.

The switch arms 76 and 77 are connected by conductors 78 and 79 with the signal identification or separation unit 71 which comprises a plurality of band pass filters 80a, 80b, 80c, 80d, 80e and 80f, a plurality of rectifiers and control tubes 83a, 83b, 83c, 83d, 83e and 83f, and a plurality of relays 84a, 84b, 84c, 84d, 84e and 84f. The band pass filters are so designed that the filter 80a will pass only the frequency produced by the audio oscillator when the contacts 48a and 49a are rendered effective. This is correspondingly true of the filters 80b, 80c, 80d and 80e. The filter 80f is provided to pass the signal produced by the audio oscillator 23 when the wave signal receiver 10a is turned on, but the position switch 50 is not in engagement with any of the contacts 48 and 49 of the position switch 24 or, in other words, the wave signal receiver 10a is tuned to what is generally termed "all others."

The signals passed by the band pass filters 80 may be used to operate certain indicators or as illustrated may be supplied to a suitable recorder. To this end, each of the filters 80 has its output connected to the particular rectifier and control tube 83 having the same subscript as the particular band pass filter. The output of each of the rectifier and control tube units 83 is connected to the particular relay 84 marked with the same subscript.

Figure 2A:
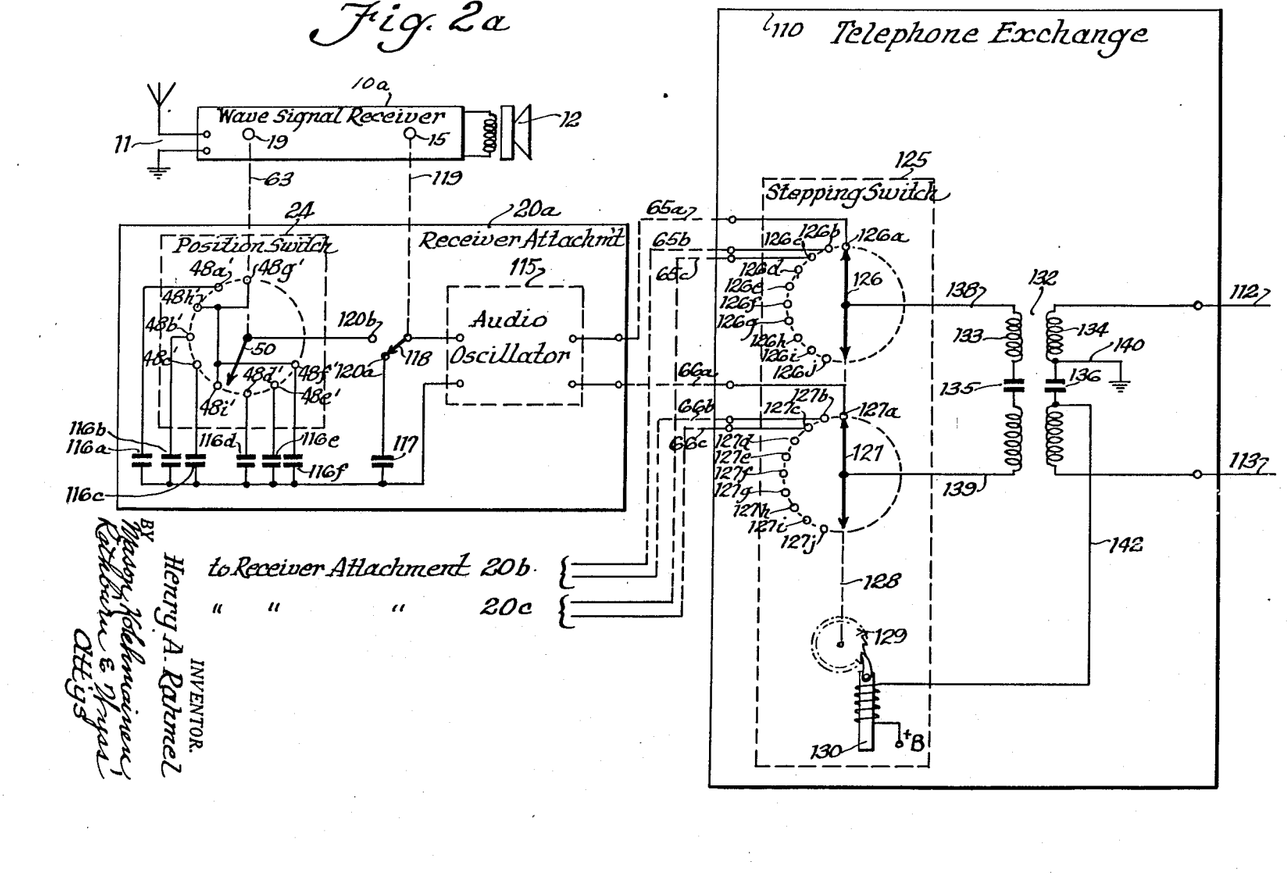
Figs. 2a and 2b are similar views illustrating another embodiment of the present invention arranged so as also to be united into a single disclosure.
Figure 2B:
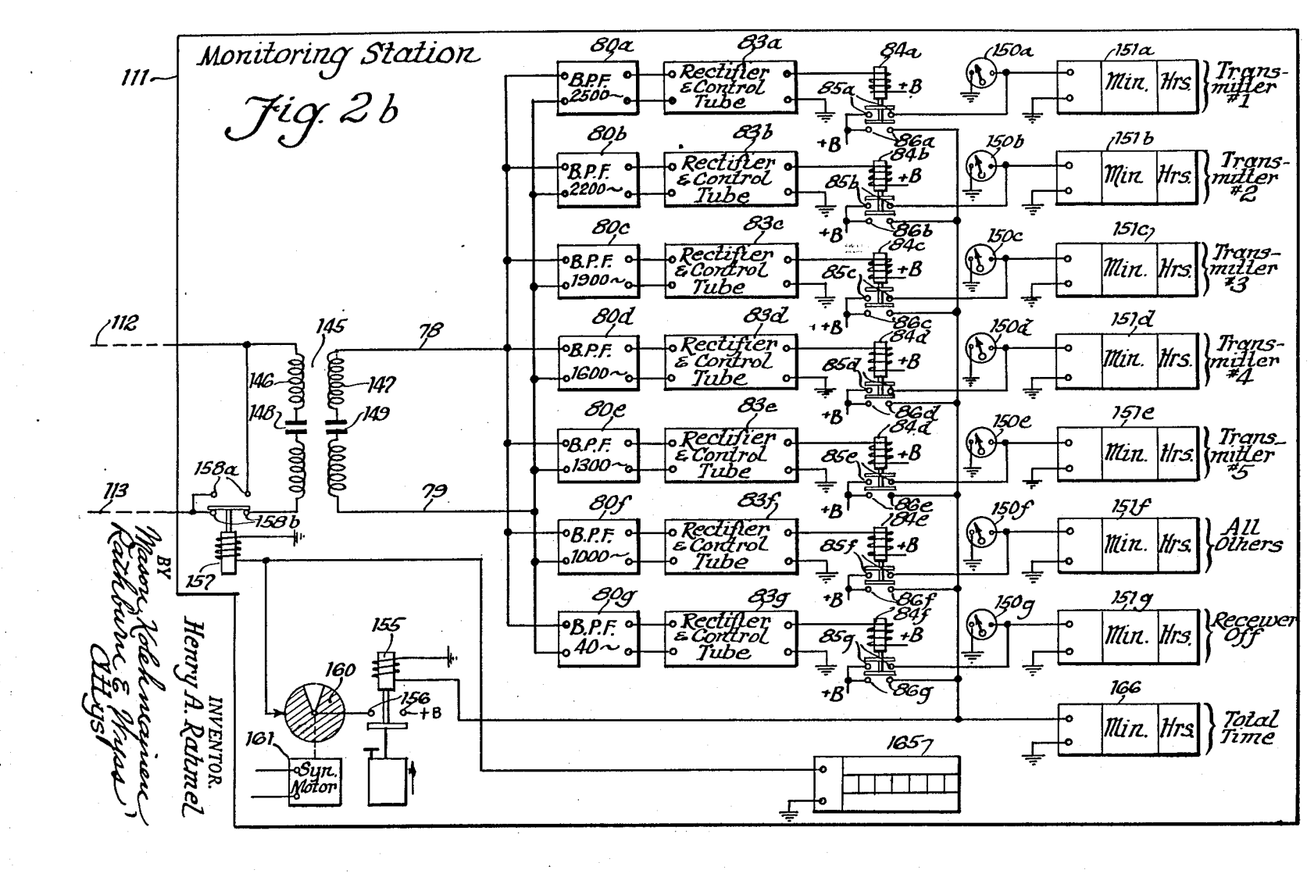

Each of the relays 84 has two sets of contacts designated as 85 and 86 respectively, also marked with the appropriate subscript. When no signal is passed by the corresponding band pass filters 80, the relays 84 are energized and the associated contacts 85 and 86 are open. In the event that a signal is passed by one or more of the band pass filters the associated relays are deenergized to close their associated contacts 85 and 86. The contacts 85 of the relays 84 are each adapted selectively to control a recording stylus of the recorder 70 described in greater detail hereinafter. It should be understood that the type of recorder employed is immaterial as far as the present invention is concerned and the particular recorder shown in the drawings is chosen by way of example only. Actually if desired, suitable indicators such as are indicated in Fig. 2b of the drawings may be employed instead of a recorder.

The recorder 70 is indicated as comprising eleven styli 89a, 89b, 89c, 89d, 89e, 89f, and 90a, 90b, 90c, 90d and 90e. As illustrated the styli 89a to 89f inclusive are connected by conductors 92a to 92f respectively with the contacts 85a to 85f of the relays 84 so as selectively to connect the styli 89 in series with a source of +B potential specifically designated as 93. As further illustrated, the recorder 70 includes a movable record receiving element 95, continuous movement of which, in the direction of the arrow, is caused by rotation of a sprocket 96. Preferably the sprocket 96 is driven by a synchronous motor 97 connected to a suitable source of power 98 so as to be driven continuously whether or not any other elements at the monitoring station 67 are energized. The recorder 70 further includes a suitable take-up spool 99 and a suitable tape supply spool not shown. By way of example, record receiving element 95 may be a chemically treated element such for example as an electrolytic paper. When an electric current is passed through such an element, a chemical action occurs which produces a trace thereon at the point of current flow. To this end the record receiving element 95 passes over a conducting shoe 101 which is connected to ground as indicated at 102. It will be apparent, therefore, that whenever a potential such as a +B potential from the source 93 is applied to any of the styli 89, a current flows through the record receiving element 95 and the resultant chemical action causes a trace to be produced thereon beneath the contacting portion of the particular stylus which is energized since this contacting portion is directly over the grounded conducting shoe 101. Due to the positioning of the styli 89 transversely of the record receiving element 95, the transverse position on the record receiving element of the trace produced by the styli is indicative of a particular transmitting station to which one or more of the receivers 10 may be tuned.

In order uniquely to identify the particular receiver or receivers tuned to transmitting stations producing record traces on the tape 95 beneath one or more of the styli 89, the styli 90 are connected respectively to a source of +B potential 93 through the contacts 75a to 75e inclusive of the rotary switch comprising the rotary switch arm 75. The contacts 75 are connected directly to the styli 90 by conductors 102, the interconnected elements being identified by reference numerals marked with the same subscripts. The switch arm 75 is connected to the source of +B potential 93 through the parallel arranged contacts 86 of the relays 84. Consequently, no trace will be produced by any stylus 90, unless there also is produced a trace by a corresponding one of the styli 89, excepting the stylus 89f which indicates "all other" listening. If, for example, the wave signal receiver 10a is turned on and tuned in the manner indicated in the drawings with the switch contacts 48e and 49e of the position switch 24 engaged by the movable contact 50, the relay 84e will be deenergized to close its contacts 85e and 86e each time the synchronous switch mechanism 69 is in a position so that the contacts marked with the subscript "a" are engaged and at this time a trace will be produced by the stylus 90a and the stylus 89e, the former indicating the particular receiver 10a involved and the latter indicating the transmitting station represented by the position switch being in engagement with contacts 48e and 49e.

In view of the detailed description included above, the operation of the present invention will readily be understood by those skilled in the art and no further discussion thereof is included herewith. Although only five receivers capable of being tuned to five transmitting stations have been indicated, it will be obvious that any number of receivers tunable to a large number of particular transmitting stations may be monitored and a record produced on a single recording element. It should be understood also that if desired, a suitable magnetic recording device may be employed with a plurality of recording heads to record the desired information and since such magnetic records are phonographically reproducible, they may be reproduced at high speed and transmitted from the monitoring station to a central station or to the headquarters of the analysis organization once a day, for example, over a subscriber's line, thereby eliminating the high expense of leased lines.

As has been pointed out above, if the homes in which receiver use is to be monitored or logged are widely scattered and quite remote from the monitoring station, the cost of leasing telephone lines for each receiver on a continuous twenty-four hour basis may be prohibitive. Under these conditions, the homes in the vicinity of a local telephone exchange may have the receiver use therein monitored and transmitted to the local telephone exchange whereby a single pair of telephone lines may transmit the information from each exchange to a monitoring station. Such an arrangement is disclosed in Figs. 2a and 2b of the drawings. The corresponding parts of Figs. 2a and 2b are designated by the same reference numerals. The essential elements of the arrangement disclosed in Figs. 2a and 2b comprise a plurality of receivers designated at 10, only the receiver 10a being shown; a plurality of receiver attachments 20, only the receiver attachment 20a being shown; one or more local telephone exchanges, generally designated at 110, remotely located with respect to the plurality of receivers 10 and associated receiver attachments 20a; a monitoring station 111 remotely located with respect to said one or more local telephone exchanges 110; a plurality of leased lines 65 and 66 extending between the monitored receivers 10 and the local telephone exchange 110; and leased trunk lines 112 and 113 extending between the telephone exchanges such as 110 and the monitoring station 111. For the sake of simplifying the drawings, only a single telephone exchange 110 is illustrated and consequently only a single set of leased trunk lines 112 and 113 between such exchange and the monitoring station are shown. It should be understood, however, that the monitoring station may be connected by similar trunk lines to a plurality of local exchanges, which exchanges in turn are each connected by a plurality of leased lines with various monitored receivers or more specifically, with the receiver attachments associated with such receivers.

No further description of the receiver 10a is included since it may be assumed to be identical with the receivers described in connection with Fig. 1a of the drawings. It should be understood that the receiver may be a television receiver or a radio receiver. In the event that it is a television receiver, which at present are tunable to a maximum of seven channels, the position switch in the receiver attachment will be provided with exactly seven steps and in such case no "all others" indication is necessary. The receiver attachment 20a is illustrated as comprising an audio oscillator generally designated at 115 which includes a plurality of capacitors 116a, 116b, 116c, 116d, 116e, 116f and 117, which may be selectively rendered effective to change the output frequency of the audio oscillator 115. This audio oscillator may be any conventional type of audio oscillator. As illustrated, the position switch 24 associated with the receiver attachment includes the contacts 48a', 48b', 48c', 48d', 48e', 48f', 48g', 48h' and 48i' which are adapted selectively to render effective the corresponding one of the capacitors 116. Preferably the contact marked with a particular subscript controls the capacitor marked with the same subscript. The contacts 48f', 48g', 48h', and 48i' are all connected together and to the capacitor 116f which controls the audio oscillator 115 to put out an audio frequency representative of "all others" listening. As in Fig. 1a of the drawings, the position switch 24 is connected by a mechanical connection 63 to the tuning knob 19 or channel selector of the receiver 10a. The capacitor 117 is rendered effective and ineffective by a two position switch 118 connected by a member 119 with the control knob 15 of the receiver 10a which controls the "on-off" condition of the receiver. When the receiver is off, the switch 118 engages contacts 120a connecting the capacitor 117 into the audio frequency oscillator circuit and disconnecting any of the other capacitors 116 which might be connected in the circuit by virtue of the position of the position switch 24. The contact 120b of the switch is engaged by the switch arm 118 when the receiver 10a is turned on so as to render effective the switch arm 50 and consequently one of the capacitors 116. As illustrated by way of example, the audio frequency oscillator may produce the following audio frequencies in dependence upon the particular tuning positions of the receiver 10a.

| Station No. | Frequency of the Audio Frequency Oscillator | Capacitor Rendered Effective |
|---|---|---|
| 1 | 2,500 | 116a |
| 2 | 2,200 | 116b |
| 3 | 1,900 | 116c |
| 4 | 1,600 | 116d |
| 5 | 1,300 | 116e |
| All others | 1,000 | 116f |
| Receiver Off | 40 | 117 |

Considering now the telephone exchange 110 which is representative of a plurality of telephone exchanges which might be employed, there is provided a stepping switch mechanism 125, in some respects quite similar to the synchronous switch mechanism 69 discussed above. In the illustrated embodiment the stepping switch mechanism 125 comprises two double switch arms 126 and 127, each capable of controlling ten switch contacts arranged in a semicircle. By employing double switch arms as indicated, the same effect is obtained as if the contacts were arranged in complete circle as in Fig. 1b of the drawings engageable by a single switch arm. These contacts are designated as 126a to 126j inclusive and 127a to 127j inclusive for the respective switch arms 126 and 127, and are connected to the particular telephone lines 65 and 66 respectively marked with the identical subscripts. The particular stepping switches included in the switch mechanism 125 are capable of selectively switching ten pairs of leased lines. It will be understood that in the event more or less than ten pairs of leased lines such as 65—66 are required, that more or less contacts for the stepping switches may be provided. The double switch arms 126 and 127 are mounted on a common shaft 128 connected to a suitable solenoid operated ratchet mechanism 129 which is actuated through energization of the solenoid 130. Each actuation of the solenoid 130 moves the stepping switches one step. The means for actuating the solenoid 130 to cause movement of the stepping switches is described in greater detail hereinafter.

As illustrated in Fig. 2a of the drawings, the switch arms 126 and 127 are connected to a repeating coil generally designated at 132 which effectively isolates the leased trunk lines 112 and 113 from the telephone exchange 110 and furthermore effectively separates the alternating current and direct current circuits. As illustrated, the repeating coil 132 comprises primary and secondary transformer windings 133 and 134. These windings 133 and 134 are each split into two sections and have interposed between the separate sections of the windings capacitors 135 and 136 respectively, which block the flow of direct current and yet permit free flow of the audio frequency output of oscillator 115. The double switch arms 126 and 127 are connected by conductors 138 and 139 with the terminals of the winding sections 133 not connected to the capacitor 135. Similarly the trunk lines 112 and 113 are connected to the terminals of the windings 134 not connected to the capacitor 136. The other terminal of one of the winding sections 134 is connected to ground as indicated at 140 while the corresponding terminal of the other section of the winding 134 is connected by conductor 142 with one terminal of the winding of the stepping switch solenoid 130, the other terminal of which is connected to a source of +B potential. It will be apparent that the blocking condenser 136 prevents the +B potential applied to the winding of solenoid 130 from reaching ground 140 except by way of the leased trunk lines 112 and 113.

The leased trunk lines 112 and 113 are indicated with a dotted line section to designate remoteness of the telephone exchange 110 from the monitoring station 111. The other end of these leased trunk lines are provided with a repeating coil 145 which may be identical with the repeating coil 132 including winding sections 146 and 147 and associated blocking capacitors 148 and 149 respectively. The terminals of the serial interconnected winding sections 146 and capacitor 148 are connected to the remote ends of the leased trunk lines 112 and 113 while the terminals of the serially arranged winding sections 147 and capacitor 149 are connected by conductors 78 and 79 which correspond to the same conductors shown in Fig. 1b of the drawings connected to the signal separation unit described hereinafter including the band pass filter units 80, the rectifiers and control tubes 83 and the relays 84. The filter units are designated by the reference numerals 80 as in the preceding embodiment with the appropriate subscripts 80a to 80g, the 80g filter passing audio frequencies produced when the effective receiver is in its off position and the capacitor 117 of the audio frequency oscillator 115 is rendered effective. The rectifier and control tube units are designated by the reference numeral 83, also as in the preceding embodiment, with appropriate subscripts including an additional unit 83g for taking care of the "receiver off" condition. Similarly the relays 84 including the contacts 85 and 86 are identical with those disclosed in the preceding embodiment except again an additional relay 84g is provided.

As illustrated in Fig. 2b, the contacts 85 of the relays 84 selectively control an indicating instrument 150 and a totalizing mechanism 151, appropriate subscripts a to f being applied to the instruments 150 and 151 associated with the particular signal path marked with a corresponding subscript. Whenever one of the relays 84 is deenergized to close its contacts 85, an associated meter 150 is energized to produce an indication that a particular transmitting station is tuned in. The mechanism 151 is a totalizing mechanism which will indicate in minutes and hours the total listening to that particular transmitting station. The various indicators 150 will provide indications with respect to the various transmitting stations, while the instrument 150f will indicate listening to "all others" stations and the indicator 150g will indicate "receiver off" conditions.

In order to provide an indication of the particular receiver producing the indication, the contacts 86 of all of the relays 84 are connected in parallel to a slow acting relay 155 which closes its contacts 156 after a predetermined time delay. The contacts 156 control the circuit for a remote stepping switch relay 157 which controls switch contacts 158a and 158b. Interposed in the circuit of the remote stepping switch relay 157 is a synchronous switch 160 suitably driven by a synchronous motor 161 which determines the length of time that a particular indication is produced by each of the indicators 150. Where, as illustrated, the stepping switches 126 and 127 are provided with ten contacts and it is desired for each contact to be engaged for six seconds, the synchronous switch 160 should make ten revolutions per minute, whereby each revolution will control movement of the stepping switches 126 and 127 through one step. The contacts 158b of the remote stepping switch relay 157 are normally closed and complete the circuit from the leased trunk lines 112 and 113 to the repeating coil 145. When the relay 157 is energized, however, the contacts 158b are opened and the contacts 158a are closed to short circuit the ends of the trunk lines 112 and 113 through the contacts 158a with the result that the energization circuit for the stepping switch solenoid 130 is closed causing the stepping switches 126 and 127 to move forward one step. Upon the delay occasioned by the time that the synchronous switch closes the circuit, the relay 157 is deenergized and the leased trunk lines 112 and 113 are again connected to the repeating coil 135.

Preferably, a monitored receiver or home indicator 165 is provided connected in parallel with a remote stepping switch relay 157 which home indicator 165 operates in synchronism with the stepping switches 126 and 127 and indicates at any instant the particular receiver 10 being monitored at that time. This indication may comprise the energization of a particular light or any other signal giving home or receiver identification. Obviously, the information provided by the indicator 165 and the indicators 150 tell you not only the receiver which is involved, but the transmitting station to which it is tuned. This information also includes "receiver off" indications.

If desired, a totalizing mechanism 166 may be connected in parallel with the slow acting relay 155 to give an indication of total monitoring time which has transpired, whereby the percentage of total listening to any one transmitting station may be obtained by merely comparing one of the indicators 151 with the indicator 166.

A record of the indications produced at the monitoring station 111 may be obtained by periodically photographing the indicators 150, 151, 165 and 166, or if desired, a recorder of the type disclosed in Fig. 1b may be employed.

As was mentioned above, in the event that the charges for the leased trunk lines, for example, are prohibitive, the information at the exchange 110 may also be recorded on phonographically reproducible means and periodically transmitted over a subscriber's telephone line at high speed.

The operation of the system and apparatus of Figs. 2a and 2b will readily be understood in view of the detailed description included above and no further discussion is included herewith.

It will be apparent to those skilled in the art that the present invention is not limited to the particular constructions and arrangements shown and described but that changes and modifications may be made without departing from the spirit and scope of the invention, and it is aimed in the appended claims to cover all such changes and modifications.

What is claimed as new and desired to be secured by Letters Patent of the United States is:

1. In a system for indicating at a remote point the tuning condition of a plurality of different wave signal receivers, the combination of a receiver attachment associated with each receiver including a signal producing device, variable impedance means for causing said device to produce a plurality of signals having distinct frequencies, a first switching means for selectively controlling said variable impedance means in response to the tuning condition of the associated receiver, whereby a signal having a distinct frequency is produced for each of a plurality of different tuning conditions of each receiver, a plurality of signal transmission links for transmitting the signal from each receiver attachment to said remote point, second switching means at said remote point for sequentially rendering each of said signal links effective one at a time, and exhibiting means for producing at said remote point indications of said signals, the frequency of which indicates the channel to which said receivers are tuned, and the particular condition of the second switching means indicating the specific one of said receivers under consideration.

2. In a system for indicating at a remote point the tuning condition of a plurality of different wave signal receivers remotely located relative to each other, the combination of an audio oscillator associated with each receiver, variable impedance means for causing said audio oscillator to produce a plurality of signals having different frequencies, a first switching means for selectively controlling said variable impedance means in response to the tuning condition of the associated receiver, whereby a signal having a different frequency is produced for each of a plurality of different tuning conditions of the associated receiver, a pair of conductors for each audio oscillator connecting the output of the associated oscillator to said remote point, second switching means at said remote point for successively rendering each pair of said conductors effective, and recording means connected to said second switching means including means for converting the audio frequency signals received at said remote point to indications of the tuning condition of said receiver and for converting the position of said second switching means to indications of the particular receiver being monitored.

3. In a system for indicating at a central station the tuning condition of a plurality of different wave signal receivers remotely located relative to each other, the combination of an audio oscillator associated with each receiver, variable means for causing said audio oscillator to produce a plurality of signals having different frequencies, a first switching means for selectively controlling said variable means in response to the tuning condition of the associated receiver, whereby a signal having a different frequency is produced for each of a plurality of different tuning conditions of each receiver, a pair of conductors for each audio oscillator connecting the output of the associated oscillator to said central station, rotary switching means at said central station for successively rendering each pair of said conductors effective to transmit signals from the audio oscillator associated with a particular receiver to said central station, means at said central station responsive to different frequencies received over said conductors for producing different predetermined indications in response to different frequencies, and means for simultaneously producing a record of said indications and the condition of said switching means, whereby a record uniquely identifying both the particular receiver and the channels to which it is tuned is obtained.

4. In a system for indicating at a remote point the transmitting stations to which each of a plurality of different remotely disposed wave signal receivers are tuned, the combination of a receiver attachment associated with each receiver including a signal producing device, variable means for causing said device to produce a plurality of signals having distinct frequencies, a first switching means for selectively controlling said variable means in response to the tuning condition of the associated receiver, whereby a signal having a distinct characteristic is produced for each of a plurality of different tuning conditions of each receiver, a plurality of signal transmission links one for each receiver attachment for transmitting the signal from each receiver attachment to said remote point, second switching means at said remote point for successively rendering said signal links effective one at a time, and exhibiting means for producing at said remote point indications of said signals, the distinct characteristics of which indicates the channel to which said receivers are tuned and the particular condition of the second switching means indicating the specific one of said receivers under consideration.

5. In a system for indicating at a central station the tuning condition of a plurality of different wave signal receivers remotely located relative to each other, the combination of a signal generator associated with each of said receivers, control means for causing said signal generator to produce a plurality of signals having different characteristics in accordance with the tuning condition of the associated receiver, a stepping switch having a plurality of contacts forming separate stepping positions and having a wiper, conducting means interconnecting the outputs of said signal generators with the contacts forming different stepping positions, common exhibiting means at said central station responsive to said different characteristics and connected to said wiper, said exhibiting means also being controlled in accordance with the position of said wiper to provide an indication of selected receivers, and means for operating said stepping switch to sequentially interconnect the common exhibiting means with said signal generators whereby a simultaneous display identifying both a predetermined receiver and the tuning condition thereof is obtained.

6. In a system for indicating at a central station the tuning condition of a plurality of different wave signal receivers remotely located relative to each other, the combination of an audio oscillator associated with each receiver, control means for causing said audio oscillator to produce signals having different frequencies in accordance with the tuning condition of their associated receivers, switching means having a plurality of separate switching positions individual to said audio oscillators, conducting means interconnecting each of said audio oscillators with one of the switching positions of said switch, frequency responsive detecting means individual to said switching means and common to said audio oscillators for providing first control signals representative of the tuning conditions of said audio oscillators, means controlled by said switching means for providing second control signals identifying the receivers, means for operating said switching means to sequentially interconnect the detecting means with each of the audio oscillators to provide a series of first and second control signals representing the tuning conditions of the plurality of successively interconnected oscillators and the identification thereof, and exhibiting means operated in accordance with said first and second control signals for providing an exhibit of the tuning condition of said plurality of receivers in conjunction with indicia individually identifying the receivers.

References Cited in the file of this patent

UNITED STATES PATENTS

| | | |
|---|---|---|
| 2,032,746 | Grant | Mar. 3, 1936 |
| 2,369,662 | Deloraine et al. | Feb. 20, 1945 |
| 2,466,804 | Giffen et al. | Apr. 12, 1949 |
| 2,484,733 | Rahmel et al. | Oct. 11, 1949 |
| 2,484,734 | Rahmel | Oct. 11, 1949 |